United States Patent [19]

Borjesson

[11] 4,054,990
[45] Oct. 25, 1977

[54] METHOD OF ARRANGING ELECTRODES OF STORAGE BATTERIES

[75] Inventor: Anders Borjesson, Alvangen, Sweden

[73] Assignee: Aktiebolaget Tudor, Sundbyberg, Sweden

[21] Appl. No.: 733,025

[22] Filed: Oct. 15, 1976

[30] Foreign Application Priority Data

Nov. 16, 1975 Sweden .............................. 7511594

[51] Int. Cl.² ............................................ H01M 2/14
[52] U.S. Cl. .................................... 29/623.1; 29/432; 29/730; 429/186
[58] Field of Search ...................... 29/623.1, 432, 730, 29/731; 429/186, 176, 129

[56] References Cited

U.S. PATENT DOCUMENTS

| 1,564,173 | 12/1925 | Ford et al. | 429/186 |
| 2,934,582 | 4/1960 | Wilson | 429/186 |
| 4,016,638 | 4/1977 | Klein | 29/730 |

*Primary Examiner*—Carl E. Hall
*Attorney, Agent, or Firm*—Burns, Doane, Swecker & Mathis

[57] ABSTRACT

In an electrode storage battery electrodes and separators are secured in predetermined positions relative to one another by inserting cutting edges into the separators and into contacting relation with the sides of the electrodes. The cutting edges can be mounted in the cell vessel carrying the electrodes and separators.

4 Claims, 3 Drawing Figures

METHOD OF ARRANGING ELECTRODES OF STORAGE BATTERIES

BACKGROUND AND OBJECTS OF THE INVENTION

The present invention concerns a method of constructing electric storage batteries. The cells of such batteries contain at least one positive electrode and at least one negative electrode and a separator to separate the electrodes. Each cell, however, commonly contains three to seven electrodes of each type. In lead storage batteries there is in each cell one negative electrode more than the number of positive electrodes. Each positive electrode is thus covered on each side by a separator which divides the positive electrode from the negative electrode. The area of the separators is somewhat larger than the area of the electrodes and it is important that the separators in the finished cell extend out beyond the electrodes by approximately an equal amount around the entire periphery of the electrodes. It is also important that all the electrodes in a cell be placed opposite one another. The invention concerns a method of constructing electric storage batteries by means of which electrode sets can be arranged and/or secured with electrodes and separators in the proper positions.

As mentioned above, it is important that electrodes and separators be placed in the proper position in relationship to one another in the battery cell. By means of the presence of the separator between the different electrodes, the electrolyte's electrical resistance to current between the electrodes is increased. In order to avoid high current densities and short circuits between the outer edges of the electrodes, the separators are made somewhat larger than the electrodes. These should therefore be placed so that they extend approximately an equal distance beyond the edge of the electrode around the entire periphery.

The connection of electrodes of the same type via a pole bridge in the cell is accomplished with various methods of construction just as the means of mounting the electrode set in the cell vessel varies. No matter what the method chosen, however, the electrode set must at some stage of construction be arranged so that the electrodes and the separators come into the proper position with respect to one another. One method of achieving this is to use holders for the electrode sets which are provided with combs, that is to say, strips which are provided with grooves for receiving the separators. The preparation of electrodes and separators involves, however, certain unavoidable variations, which lead to small variations in the thickness of the finished product. This in turn leads to problems with the use of combs for arranging the electrode sets.

One has, therefore, tried to find a construction method where one can avoid the use of combs as described above. One such method and apparatus therefor is described in Swedish patent No. 363,705. According to the method therein described, the positioning of the electrodes takes place with the help of so-called feet, that is, extensions of the lower surface of the electrodes. The separators are arranged with the help of guide strips.

It is, therefore, an object of the present invention to provide novel methods and apparatus for positioning electrodes relative to separators.

It is another object of the invention to provide such methods and apparatus which can eliminate the need for feet on the electrodes.

BRIEF SUMMARY OF THE INVENTION

Compared to earlier known methods this invention has a number of advantages. The newly invented method can be applied without regard to the variations in thickness of the electrodes and separators. The method is so flexible that the same apparatus can be used for electrode sets with a varying number of electrodes and hence with greatly varying thickness. Compared with earlier known methods and apparatus, the equipment needed to carry out the method is very simple. A further advantage is that special arrangements on the electrodes, such as the feet mentioned above, can be avoided completely. The method of the invention can even be applied to all present methods of construction of electrode sets and storage batteries.

According to the invention, which concerns a means for arranging and/or securing electrode sets in the construction of electric storage batteries, this takes place in that the position of the electrodes in relationship to the separators is controlled by edges or other cutting means, which cut into the separators and approach the electrodes. By the expression "edges or other cutting means" is meant, for example, thin-bladed knife edges or the like, such as razor blades, very thin steel wire, knife-like objects of other materials than steel and all other imaginable forms of means which can cut into the separators in such a way that undue damage to these is avoided. In order to simplify the description all such arrangements or means will be called "edges" in the following. In the following the invention will be more fully described with reference to the figures.

THE DRAWINGS

Preferred embodiments of the invention are described hereafter in detail in conjunction with the accompanying drawings in which.

DETAILED DESCRIPTION OF PREFERRED EMBODIMENT

Figure 1:
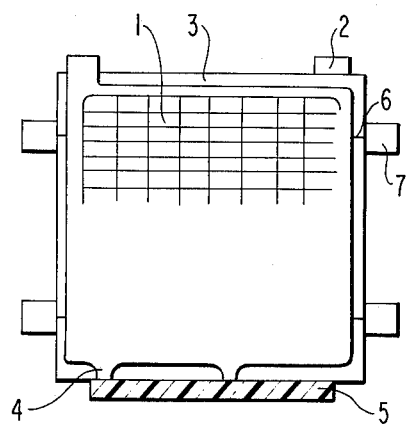
FIG. 1 shows the arrangement of an electrode set in a holder.
Figure 2:
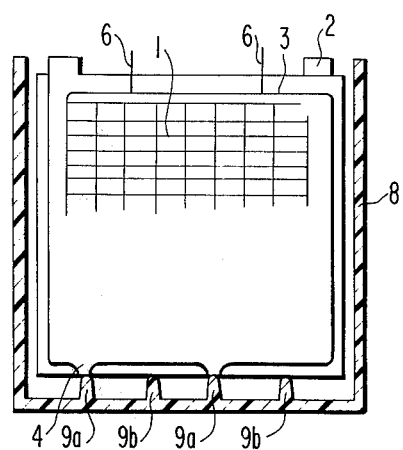
FIG. 2 shows the securing of an electrode set in a cell vessel.

In the construction of storage batteries and the electrode sets for them, the electrodes and separators which comprise each electrode set are stacked in a pile. Generally, the electrodes contained therein are connected to the others of the same type by pole bridges before the electrode sets are placed in the cell vessel. Before the pole bridges are made, however, the electrode sets must be arranged so that the electrodes and the separators come into the proper relationship with each other. This can take place as shown in FIG. 1 by placing the electrode set in a holder, schematically shown in the figure with a bottom plate 5. In the electrode set are electrodes of one type 1, separators 3, and electrodes of the other type 2, of which only the tab is visible in the figure. In this case the electrodes are provided with so-called feet 4. The feet on the positive and the negative electrodes are displaced with respect to one another, but all rest upon the bottom plate. After the electrode set is placed so that all the electrodes and separators rest on the bottom plate, edges 6 mounted in holders 7 are moved in from both sides. The very thin edges then cut into the separators and continue their motion forward until they come into contact with the electrodes. Thereafter they continue their motion only to the extent that the electrodes are moved into their proper position. The edges can have a depth which just corresponds to the distance by which the separators shall extend out beyond the electrodes, so that possible misplaced separators are carried into their proper position by action of the knife holders 7. After the electrode set has been arranged by this means, it can be held in place either by the edges and their holders remaining in place in their final position or by another known means. FIG. 2 shows how an electrode set in a cell vessel is arranged in the vertical plane and secured. In this example, too, the electrodes 1, 2 are provided with feet 4, by means of which electrodes of one type rest on ridges 9a on the floor of the cell vessel, while electrodes of the other type are offset and rest on other ridges 9b. The electrode sets are arranged in the vertical plane and held in place with the help of edges 6 which intrude through the separators and come to rest against the electrodes. The edges can be fixed in holders in the same way as in the foregoing example. They can also be fastened to or form a part of the cell cover. As a rule the force which the edges exert on the separators should be sufficient to arrange these also in the vertical plane, but if necessary, special means may be employed to arrange and hold the separators.

Figure 3:
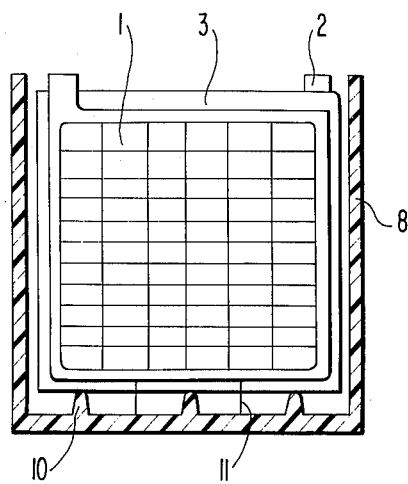
FIG. 3 shows the arrangement and securing of an electrode set where the electrodes lack feet.

In FIG. 3 is shown a further application of the invention. Electrode sets with electrodes (1), (2) and separators (3) are placed in a cell vessel (8). In the bottom of the vessel are support ridges of two types. Some of the ridges are of the conventional construction (10) and others are in the form of support strips constructed as the edges (11) according to the invention. These edges cut into the separators and form a support for the electrodes, by reason of which the feet in the earlier example of construction can be eliminated. By this means, important advantages are achieved, partly through a diminished requirement for lead for the electrode body and partly through an increased margin for short-circuit from sludge formation and sludge build-up on the bottom of the cell.

The function of the separators to prevent short-circuit through direct contact between electrodes must, of course, not be jeopardized by using the method of the invention. It is, therefore, important that the construction of the edges be suited to the separator type employed. It has been demonstrated, however, that sharp edges made of thin steel or other material with sufficient hardness give satisfactory results with the types of separators most commonly used. The thin cuts which occur in the edge of the separators, for example, when applying the invention as described in the example of FIG. 1, do not cause any lasting damage to the separator. The materials commonly used for separators have the property that after the edges have been removed, the cuts in the separators close again. In applying the invention to holders for electrode sets which do not make up a part of the finished cell, it is generally preferred that the edges be constructed of steel. In other applications in which the edges are fastened to or form a part of the cell vessel or the cell cover, the edges are preferably made from a material which will withstand the environment, for example, plastic. It is becoming more common to use vessels and covers of plastic, for example, polypropylene, and the edges can then be made of the same material and form a part of the vessel or cover.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for arranging the electrodes of an electrode set in the assemblage of an electric storage battery, comprising the steps of providing an electrode set which contains at least one positive electrode and at least one negative electrode and at least one separator for separating the electrodes, and inserting cutting edges into said separator such that said cutting edges cut into said separator and contact said electrodes to locate said electrodes in predetermined position relative to said separator.

2. A method according to claim 1 further including the steps of placing said electrode set in a cell vessel and then inserting a plurality of said cutting edges in at least two locations along at least one side of said electrode set until said cutting edges contact the outer edge of said electrodes.

3. A method according to claim 1 further including the steps of placing said electrode set in a cell vessel such that said at least one separator is supported upon ridges extending upwardly from the bottom of said vessel, and said electrodes are supported upon said cutting edges which extend upwardly from the vessel bottom beyond the tops of said ridges.

4. A method according to claim 1 wherein said electrode set contains a plurality of negative electrodes, a plurality of positive electrodes and a plurality of separators, and said cutting edges are inserted into said plurality of separators.

* * * * *